United States Patent
Song et al.

(10) Patent No.: US 11,733,048 B2
(45) Date of Patent: Aug. 22, 2023

(54) ELECTRONIC APPARATUS AND CONTROL METHOD THEREOF

(71) Applicant: SAMSUNG ELECTRONICS CO., LTD., Suwon-si (KR)

(72) Inventors: Euihyun Song, Suwon-si (KR); Sejin Kwak, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 120 days.

(21) Appl. No.: 16/944,373

(22) Filed: Jul. 31, 2020

(65) Prior Publication Data
US 2021/0033405 A1     Feb. 4, 2021

Related U.S. Application Data

(60) Provisional application No. 62/880,785, filed on Jul. 31, 2019.

(30) Foreign Application Priority Data

Nov. 19, 2019     (KR) .......................... 10-2019-0148623

(51) Int. Cl.
*G01C 21/32* (2006.01)
*G01C 21/36* (2006.01)
(Continued)

(52) U.S. Cl.
CPC ........... *G01C 21/32* (2013.01); *G01C 21/367* (2013.01); *G01C 21/3682* (2013.01); *G05D 1/0274* (2013.01); *G08G 1/096844* (2013.01)

(58) Field of Classification Search
CPC .... B25J 11/008; B25J 11/0045; B25J 9/1664; B65G 47/90; G05B 2219/45083;
(Continued)

(56) References Cited

U.S. PATENT DOCUMENTS

| | | | |
|---|---|---|---|
| 5,839,115 A | * | 11/1998 | Coleman ................ G06Q 50/12 705/15 |
| 6,315,039 B1 | * | 11/2001 | Westbrooks, Jr. .... A47J 39/006 99/332 |

(Continued)

FOREIGN PATENT DOCUMENTS

| | | |
|---|---|---|
| JP | 5174201 B2 | 4/2013 |
| JP | 2018-156495 A | 10/2018 |

(Continued)

OTHER PUBLICATIONS

"PuduBot普渡送餐机器人 欢乐送" ", YouTube, Uploaded by Jun Li on Jul. 12, 2018 (Year: 2018)—https://www.youtube.com/watch?v=bjiGL8XaG-I.*

(Continued)

*Primary Examiner* — Vivek D Koppikar
*Assistant Examiner* — Godfrey Aleksander Maciorowski
(74) *Attorney, Agent, or Firm* — Sughrue Mion, PLLC

(57) ABSTRACT

An electronic apparatus includes a plurality of trays on which a plurality of service items are provided; a plurality of sensors respectively disposed above the plurality of trays; a memory configured to store map information of a specific space; and a processor configured to: identify a respective service item provided on each of the plurality of trays, based on sensing data received from the plurality of sensors, based on a result of the identifying and the map information stored in the memory, identify a travel path to sequentially deliver each of the plurality of service items that are identified to a plurality of locations corresponding to the specific space, and control travel of the electronic apparatus, based on the travel path.

18 Claims, 9 Drawing Sheets

(51) Int. Cl.
*G08G 1/0968* (2006.01)
*G05D 1/02* (2020.01)

(58) Field of Classification Search
CPC ...... A47G 23/08; G01C 21/32; G05D 1/0212; G06Q 10/087; B60W 60/002
See application file for complete search history.

(56) References Cited

U.S. PATENT DOCUMENTS

| | | | |
|---|---|---|---|
| 10,556,334 B1 * | 2/2020 | Theobald | G05D 1/0223 |
| 2009/0048890 A1 * | 2/2009 | Burgh | G06Q 10/06375 705/7.26 |
| 2017/0148162 A1 * | 5/2017 | Kang | G16H 20/60 |
| 2017/0369256 A1 * | 12/2017 | Nguyen | B65G 51/24 |
| 2018/0075774 A1 * | 3/2018 | Puri | G09B 19/0092 |
| 2019/0057342 A1 * | 2/2019 | Ferguson | B60R 19/483 |
| 2019/0086934 A1 * | 3/2019 | Canoso | G05D 1/0274 |
| 2020/0209865 A1 * | 7/2020 | Jarvis | G06Q 10/08355 |

FOREIGN PATENT DOCUMENTS

| | | |
|---|---|---|
| KR | 10-0881947 B1 | 2/2009 |
| KR | 10-2009-0057868 A | 6/2009 |
| KR | 10-0924274 B1 | 10/2009 |
| KR | 10-1200270 B1 | 11/2012 |
| KR | 10-2016-0001579 A | 1/2016 |
| KR | 10-1852026 B1 | 4/2018 |
| KR | 10-1855861 B1 | 5/2018 |
| KR | 10-2018-0109120 A | 10/2018 |
| KR | 10-2019-0011856 A | 2/2019 |
| KR | 10-2019-0048674 A | 5/2019 |

OTHER PUBLICATIONS

"Apex AnyWhere Flow-Through Lockers Provide Two-Sided Workflow for Self-Serve Carryout Order Pick-up", YouTube, Uploaded by apexvid on May 27, 2016 (Year: 2016)—https://www.youtube.com/watch?v=BYlmry4qo2l.*

YouTube Video Entitled "PuduBot普渡送餐机器人 欢乐送" "(Year: 2018).*

YouTube Video Entitled "PuduBot普渡送餐机器人 欢乐送" "(Year: 2018).*

YouTube Video Entitled Apex AnyWhere Flow-Through Lockers Provide Two-Sided Workflow for Self-Serve Carryout Order Pick-up (Year: 2016).*

"Jingdong.com opens robot restaurant in Tianjin" Future Technology, Nov. 13, 2018, [retrieved from irobotnews.com] (6 pages total).

"Chef robot" evolution repeatedly leads to the unmanned economy Professional Services Robot, Jan. 15, 2019, [retrieved from irobotnews.com] (4 pages total).

* cited by examiner

ELECTRONIC APPARATUS AND CONTROL METHOD THEREOF

CROSS-REFERENCE TO RELATED APPLICATION(S)

This application is based on and claims priority under 35 U.S.C. § 119 to Korean Patent Application No. 10-2019-0148623, filed on Nov. 19, 2019, in the Korean Intellectual Property Office, and U.S. Provisional Application No. 62/880,785, filed on Jul. 31, 2019, in the United States Patent and Trademark Office, the disclosures of which are incorporated by reference herein in their entireties.

BACKGROUND

1. Field

The disclosure relates to an electronic apparatus, and a control method thereof, and more particularly, to an electronic apparatus configured to deliver a service item, and a control method thereof.

2. Description of Related Art

With the development of electronic technologies, various types of electronic apparatuses have been developed and become popular.

An electronic apparatus, such as a kiosk or a robot, that replaces a human in a store, a café, a restaurant, or the like, is becoming popular. The electronic apparatus may perform an operation, such as processing a customer's order request, providing a delivery to a customer, or the like.

There has been a continuing need for a method for providing consistent services to a number of customers in order for an electronic apparatus, such as a robot, to replace a human to perform an operation more consistently with that of a human, and to efficiently deliver ordered food so that a number of customers can be satisfied.

In the related art, a method of efficiently delivering an ordered food and a service good with only a small number of robots to satisfy a plurality of customers is insufficient.

SUMMARY

Provided is an electronic apparatus for effectively delivering a service item to a customer, and a control method thereof.

In accordance with an aspect of the disclosure, there is provided an electronic apparatus including: a plurality of trays on which a plurality of service items are provided; a plurality of sensors respectively disposed above the plurality of trays; a memory configured to store map information of a specific space; and a processor configured to: identify a respective service item provided on each of the plurality of trays, based on sensing data received from the plurality of sensors, based on a result of the identifying and the map information stored in the memory, identify a travel path to sequentially deliver each of the plurality of service items that are identified to a plurality of locations corresponding to the specific space, and control travel of the electronic apparatus, based on the travel path.

The processor may be further configured to: receive respective service request information corresponding to each of the plurality of locations in the specific space from another electronic apparatus, and identify the respective service items corresponding to each of the plurality of locations based on the service request information, wherein the service request information may include location information identifying each of the plurality of locations and information identifying the respective service items corresponding to each of the plurality of locations.

The service request information may include respective service request time information for each of the respective service items, and wherein the processor may be further configured to identify the travel path based on the service request time information and the location information.

The processor may be further configured to identify the travel path based on the service request time information so that a service item having a service request time exceeding a threshold time is delivered before other service items.

The processor may be further configured to: based on receiving, from another electronic apparatus, service request information corresponding to a first location that is different from the plurality of locations in the specific space, identify a preparation time to prepare a service item corresponding to the service request, compare the preparation time and a travel time for completing travel on the travel path, and based on the preparation time being less than the travel time, control travel of the electronic apparatus such that travel along the travel path begins after the service item is placed on one of the plurality of trays.

The processor may be further configured to, based on identifying that the service item corresponding to the service request information is placed on one of the plurality of trays, identify the travel path to sequentially deliver the respective service items corresponding to the plurality of locations and the first location, and control travel of the electronic apparatus, based on the travel path.

A tray, of the plurality of trays, may have a higher priority than other trays of the plurality of trays, and the processor may be further configured to identify the travel path so that a service item placed on the tray having the higher priority is delivered to a corresponding location among the plurality of locations in the specific space before other service items are delivered to corresponding locations.

The plurality of trays may include a first tray that is disposed above a second tray, the plurality of sensors may include a first sensor disposed above the first tray and configured to sense a first service item provided on the first tray, and a second sensor disposed above the second tray and configured to sense a second service item provided on the second tray, and the second sensor may be disposed underneath the first tray.

The processor may be further configured to: based on identifying that a service item, among the plurality of service items, corresponds to a predetermined item, identify the travel path so that the identified service item is delivered to a corresponding location in the specific space before other service items of the plurality of service items.

The electronic apparatus may further include: a plurality of light emitting devices provided on each of the plurality of trays, and the processor may be further configured to, based on the electronic apparatus arriving at a location, of the plurality of locations, in the specific space, cause the plurality of light emitting devices corresponding to a tray on which a service item corresponding to the location is placed to emit light.

In accordance with an aspect of the disclosure, there is provided a method for controlling an electronic apparatus including a plurality of trays on which a plurality of service items are provided and a plurality of sensors respectively disposed above the plurality of trays, the method including: identifying a respective service item provided on each of the plurality of trays, based on sensing data received from the plurality of sensors; based on a result of the identifying and map information of a specific space, identifying a travel path to sequentially deliver each of the plurality of service items that are identified to a plurality of locations corresponding to the specific space; and controlling travel of the electronic apparatus, based on the travel path.

The method may further include: receiving respective service request information corresponding to each of the plurality of locations in the specific space from another electronic apparatus; and identifying the respective service items corresponding to each of the plurality of locations based on the service request information, wherein the service request information may include location information identifying each of the plurality of locations and information identifying the respective service items corresponding to each of the plurality of locations.

The service request information may include respective service request time information for each of the respective service items, and the identifying the travel path may include identifying the travel path based on the service request time information and the location information.

The identifying the travel path may include identifying the travel path based on the service request time information so that a service item having a service request time exceeding a threshold time is delivered before other service items.

The method may further include: based on receiving, from another electronic apparatus, service request information corresponding to a first location that is different from the plurality of locations in the specific space, identify a preparation time to prepare a service item corresponding to the service request; comparing the preparation time and a travel time for completing travel on the travel path; and based on the preparation time being less than the travel time, controlling travel of the electronic apparatus such that travel along the travel path begins after the service item is placed on one of the plurality of trays.

The identifying the shortest travel path may include, based on identifying that the service item corresponding to the service request information is placed on one of the plurality of trays, identifying the travel path to sequentially deliver the respective service items corresponding to the plurality of locations and the first location.

A tray, of the plurality of trays, may have a higher priority than other trays of the plurality of trays, and the identifying the shortest travel path may include identifying the travel path so that a service item placed on the tray having the higher priority is delivered to a corresponding location among the plurality of locations in the specific space before other service items are delivered to corresponding locations.

The plurality of trays may include a first tray that is disposed above a second tray, the plurality of sensors may include a first sensor disposed above the first tray and configured to sense a first service item provided on the first tray, and a second sensor disposed above the second tray and configured to sense a second service item provided on the second tray, and the second sensor may be disposed underneath the first tray.

The identifying the shortest travel path may include based on identifying that a service item, of the plurality of service items, corresponds to a predetermined item, identifying the travel path so that the identified service item is delivered to a corresponding location in the specific space before other service items of the plurality of service items.

A plurality of light emitting devices may be provided on each of the plurality of trays, and the method further may include, based on the electronic apparatus arriving at a location, of the plurality of locations, in the specific space, causing the plurality of light emitting devices corresponding to a tray on which a service item corresponding to the location is placed to emit light.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
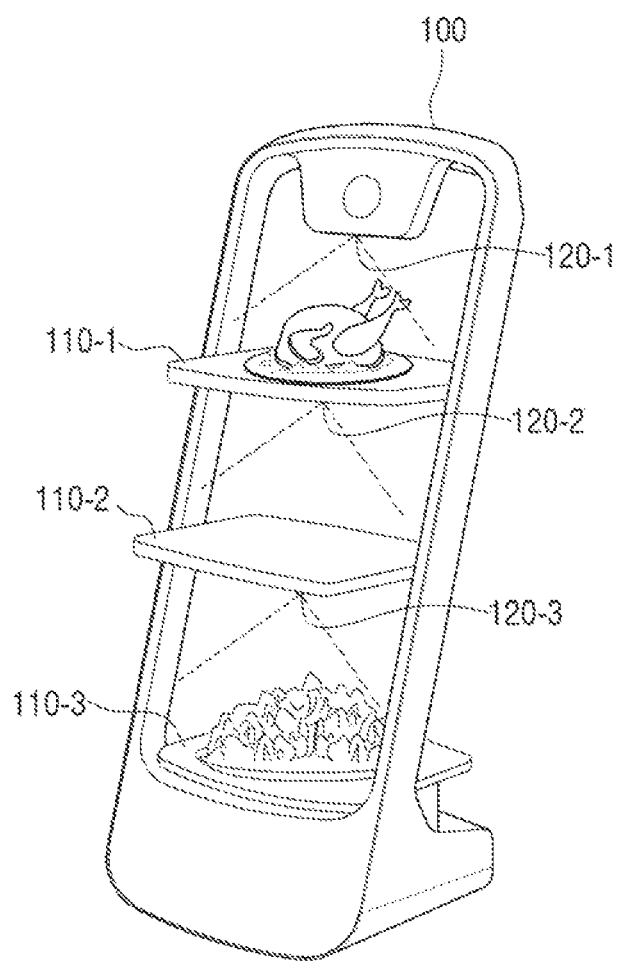
FIG. 1 is a diagram illustrating an electronic apparatus according to an embodiment.

After terms used in the present specification are briefly described, the disclosure will be described in detail.

The terms used in the present disclosure and the claims are general terms identified in consideration of the functions of the various embodiments of the disclosure. However, these terms may vary depending on intention, technical interpretation, emergence of new technologies, and the like, of those skilled in the related art. Unless a specific definition of a term is provided, the term may be understood based on the overall content and technological understanding of those skilled in the related art.

Since the disclosure may be variously modified and have several embodiments, specific non-limiting example embodiments of the disclosure will be illustrated in the drawings and be described in detail in the detailed description. However, it is to be understood that the disclosure is not limited to specific non-limiting example embodiments, but includes all modifications, equivalents, and substitutions without departing from the scope and spirit of the disclosure. A detailed description of known configurations related to the disclosure may be omitted so as to not obscure the gist of the disclosure.

Terms such as "first," "second," and the like, may be used to describe various components, but the components should not be limited by the terms. The terms are used to distinguish a component from another component.

The expression "at least one of a, b or c" indicates only a, only b, only c, both a and b, both a and c, both b and c, all of a, b, and c, or variations thereof.

A singular expression includes a plural expression, unless otherwise specified. It is to be understood that the terms such as "comprise," "comprising," "including," and the like, are used herein to designate a presence of a characteristic, number, step, operation, element, component, or a combination thereof, and do not preclude a presence or a possibility of adding one or more of other characteristics, numbers, steps, operations, elements, components or a combination thereof.

Terms such as "module," "unit," "part," and the like, may be used to refer to an element that performs at least one function or operation, and the element may be implemented as hardware, software, or a combination of hardware and software. Further, except for when each of a plurality of "modules," "units," "parts," and the like, is implemented in an individual hardware, the components may be integrated in at least one module or chip and may be implemented by at least one processor.

Hereinafter, non-limiting embodiments of the disclosure will be described in detail with reference to the accompanying drawings so that those skilled in the art to which the disclosure pertains may easily practice the disclosure. However, the disclosure may be implemented in various different forms and is not limited to embodiments described herein. In addition, in the drawings, portions unrelated to the description will be omitted, and similar portions will be denoted by similar reference numerals throughout the specification.

FIG. 1 is a diagram illustrating an electronic apparatus according to an embodiment.

Referring to FIG. 1, an electronic apparatus 100 according to an embodiment may include at least one of, for example, and without limitation, a user terminal device, a display device, a set-top box, a tablet personal computer (PC), a smartphone, an electronic book reader, a desktop PC, a laptop PC, a workstation, a server, a personal digital assistant (PDA), a portable multimedia player (PMP), a moving picture experts group phase 1 or phase 2 (MPEG-1 or MPEG-2) audio layer 3 (MP3) player, a kiosk, or the like. Additionally, the electronic apparatus 100 may be implemented as various types of electronic apparatuses such as a wearable device corresponding to at least one of an accessory type (e.g., a watch, a ring, a bracelet, a wrinkle bracelet, a necklace, a pair of glasses, a contact lens or a head-mounted-device (HMD), or the like), a fabric or a garment-embedded type (e.g., an electronic clothing, or the like), a robot including a driver, a projector, a server, or the like.

The electronic apparatus 100 according to an embodiment may be implemented as a robot. The robot may refer to a variety of types of machines configured to perform a function. For example, a robot may refer to a smart machine that senses a surrounding environment in real time based on a sensor, a camera, or the like, and, in addition to performing a simple repetitive function, collects information, and operates autonomously.

The robot may include a driver that includes an actuator or a motor. According to an embodiment, a robot may control a movement of a robot joint (e.g., an articulated joint, or the like) by using a driver. The driver may include a wheel, a brake, or the like, and the robot may be implemented as a mobile robot that is self-movable within a specific space using the driver. The robot joint may refer to a component of a robot that performs a function of a human arm or hand.

The robot may be classified into a use for industry, medical field, home, military, exploration, or the like, depending on a field of use or a function that the robot is configured to perform. According to an embodiment, an industrial robot may be a robot configured to perform a manufacturing process of a product in a factory, a robot configured to serve a customer at a store or restaurant, a robot configured to receive an order and serve the order, or the like. For example, the electronic apparatus 100 according to an embodiment may be implemented with a serving robot configured to deliver a service item from various locations, such as restaurants, hotels, marts, hospitals, clothing stores, or the like, to a location desired by a user, or a specific location. However, the robot may be variously classified according to an application field, a function, and a purpose of use, and is not limited to the above-described examples.

The electronic apparatus 100 will be described as a robot for convenience.

Referring to FIG. 1, the electronic apparatus 100 includes a plurality of trays 110 and a plurality of sensors 120 respectively disposed above each of the plurality of trays 110.

Each of the plurality of trays 110 may be a plate-shaped tray having a predetermined area in a direction parallel to the bottom surface. Service items may be provided on the plurality of trays 110, and may be accepted from each of the plurality of trays 110.

The electronic apparatus 100 according to an embodiment may include the sensor 120 disposed above each of a plurality of trays. The sensor 120 is configured to acquire an image of the service item mounted on the corresponding tray 110. According to an embodiment, the sensor 120 may be implemented with a camera, and the camera may be implemented as a red-green-blue (RGB) camera, a three-dimensional (3D) camera, or the like. A camera is configured to capture a still image or a moving image. The camera may capture a still image at a particular point in time, or may continuously capture a still image. The electronic apparatus 100 according to an embodiment may identify a service item mounted on each of a plurality of trays 110 based on sensing data received from the sensor 120.

The electronic apparatus 100 according to an embodiment may include a first tray 110-1, a second tray 110-2, and a third tray 110-3, and may include a first sensor 120-1, a second sensor 120-2, and a third sensor 120-3. The first sensor 120-1 may correspond to the first tray 110-1, the second sensor 120-2 may correspond to the second tray 110-2, and the third sensor 120-3 may correspond to the third tray 110-3.

The electronic apparatus 100 may identify the service item provided on the first tray 110-1 based on the sensing data received from the first sensor 120-1. As another example, the electronic apparatus 100 may identify that there is no service item provided on the second tray 110-2 based on the sensing data received from the second sensor 120-2. The following describes various embodiments in which the electronic apparatus 100 identifies a travel path for delivering a service item to a corresponding location within a specific space.

Figure 2:
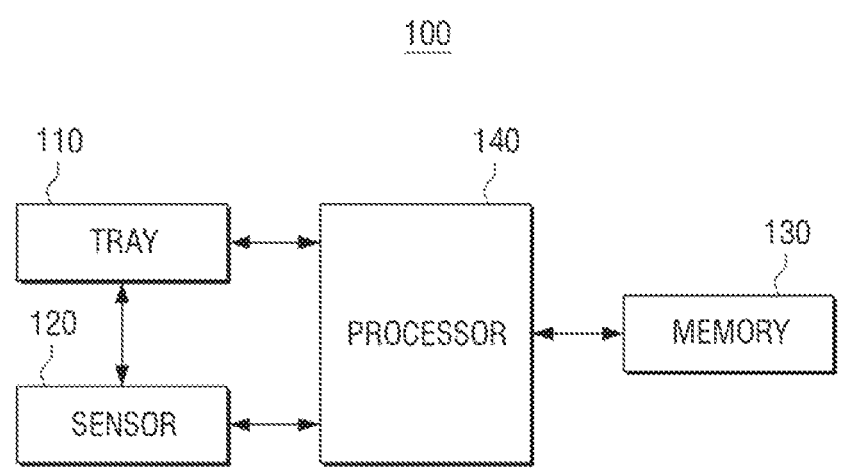
FIG. 2 is a block diagram illustrating a configuration of an electronic apparatus according to an embodiment.

FIG. 2 is a block diagram illustrating a configuration of an electronic apparatus according to an embodiment.

Referring to FIG. 2, the electronic apparatus 100 may include a tray 110, a sensor 120, a memory 130, and a processor 140.

Each of a plurality of trays 110 according to an embodiment may be provided on a body of the electronic apparatus 100 at different heights. For example, each of the plurality of trays 110 may be provided on a main body of the electronic apparatus 100 and maintained in a fixed location. As another example, each of the plurality of trays 110 may be changed in height flexibly by a motor, or the like, provided in the main body of the electronic apparatus 100. As another example, each of the plurality of trays 110 may be implemented in a detachable form, and may be attached to or detached from the main body of the electronic apparatus 100 by the control of the electronic apparatus 100 or manipulation of the user.

The electronic apparatus 100 may include a sensor 120 corresponding to each of the plurality of trays 110. According to an embodiment, a sensor 120 corresponding a tray 110 may be provided on a lower portion of another tray 110. For example, and referring to FIG. 1, the second sensor 120-2 corresponding to the second tray 110-2 may be provided on a lower portion of the first tray 110-1 to sense a service item mounted on the second tray 110-2. As another example, the first sensor 120-1 corresponding to the first tray 110-1 may be provided on the upper end of the main body of the electronic apparatus 100 to sense a service item mounted on the first tray 110-1. The electronic apparatus 100 may be provided at an upper end thereof with a camera or sensor for sensing information associated with an obstacle located on the front surface of the electronic apparatus 100, and location information within a specific space. The specific space may refer to a store, a restaurant, or the like, and the electronic apparatus 100 may perform an operation such as receiving an order, serving a service item, responding to a customer, receiving payment, or the like, as a service provided in a store, restaurant, or the like. A user may refer to a store, a user of a restaurant, a customer, a staff, or the like.

The memory 130 may be implemented as an internal memory such as a read-only memory (ROM) (e.g., electrically erasable programmable read-only memory (EE-PROM), or the like) and a random-access memory (RAM), or a memory separate from the processor 140. In this case, the memory 130 may be implemented as at least one of a memory embedded within the electronic apparatus 100 or a memory detachable from the electronic apparatus 100 according to the usage of data storage. For example, the data for driving the electronic apparatus 100 may be stored in the memory embedded within the electronic apparatus 100, and the data for upscaling of the electronic apparatus 100 may be stored in the memory detachable from the electronic apparatus 100. A memory 130 embedded in the electronic apparatus 100 may be implemented as at least one of a volatile memory such as a dynamic random access memory (DRAM), a static random access memory (SRAM), a synchronous dynamic random access memory (SDRAM), or a non-volatile memory (e.g., one time programmable ROM (OTPROM), programmable ROM (PROM), erasable and programmable ROM (EPROM), EEPROM, mask ROM, flash ROM, a flash memory (e.g., NAND flash or NOR flash), a hard disk drive (HDD), a solid state drive (SSD), or the like. A memory 130 detachably mounted to the electronic apparatus 100 may be implemented as a memory card (e.g., a compact flash (CF), a secure digital (SD), micro secure digital (micro-SD), a mini secure digital (mini-SD), an extreme digital (xD), a multi-media card (MMC), etc.), an external memory (e.g., a universal serial bus (USB) memory, or the like) connectable to the USB port, or the like.

The memory 130 according to an embodiment may store map information for a specific space. The map information may refer to information identifying the physical terrain of a specific space in which the electronic apparatus 100 is configured to operate, and may be stored in the form of an image in the memory 130, but is not limited thereto.

The map information for the specific space may include information identifying an object included in the specific space in which the electronic apparatus 100 is configured to operate, section information of each of a plurality of sections, or the like.

An "object included in a specific space" may refer to, for example, a table, a seat where a person may seat, or the like, in the case of the specific space being a restaurant. The map information for a specific space may include identification information and location information of an object, such as a table, a seat, etc., provided in the specific space.

Further, "section information of each of the plurality of sections included in a specific space" may refer to information identifying each of the plurality of sections. For example, where a specific space is a restaurant, the plurality of sections may include a kitchen, a payment zone, a plurality of rooms, etc., provided in the restaurant. The map information for a specific space may include information identifying a location and a size of each section of the specific space.

The map information for a specific space may be received from an external server and stored in the memory 130, or obtained based on sensing data or images obtained through a sensor or camera provided in electronic apparatus 100.

The memory 130 according to an embodiment may store a trained machine learning network model to identify a service item based on sensing data and an image. The machine learning network model may be an artificial intelligence (AI) model which is generated using machine learning based on a plurality of images.

The processor 140 may be a general-purpose processor such as a central processing unit (CPU), an application processor (AP), a digital signal processor (DSP), a dedicated processor, or the like, a graphics-only processor such as a graphics processor (GPU), a vision processing unit (VPU), an AI-only processor such as a neural network processor (NPU), or the like, but the processor is not limited thereto. The processor 140 may control processing of the input data according to a predefined operating rule or AI model stored in the memory 130. If the processor 140 is an AI-only processor, the AI-only processor may be designed with a hardware structure specialized for the processing of a particular AI model.

"Generated using machine learning" may refer to generating a predetermined operating rule or AI model configured to perform a desired feature using various training data and training algorithms. The training may be accomplished through a separate server and/or system, but is not limited thereto, and may be performed by the electronic apparatus 100. Examples of training algorithms include, but are not limited to, supervised learning, unsupervised learning, semi-supervised learning, or reinforcement learning.

The AI model may include a plurality of neural network layers. Each of the plurality of neural network layers includes a plurality of weight values, and may perform a neural network processing operation through an iterative operation leveraging results of a previous layer and a plurality of weight values. The plurality of weight values included in the plurality of neural network layers may be optimized by training results of the AI model. For example, the plurality of weight values may be updated such that a loss value or a cost value obtained by the AI model is reduced or minimized during the training process. For example, the plurality of weight values may be updated such that loss values or cost values obtained in the AI model during the training process are reduced or minimized. The artificial neural network may include a deep neural network (DNN) and may include, for example, but is not limited to, a convolutional neural network (CNN), a recurrent neural network (RNN), a restricted Boltzmann machine (RBM), a deep belief network (DBN), bidirectional recurrent deep neural network (BRDNN), a deep Q-network, or the like.

The trained AI model according to an embodiment may identify a service item placed at a tray 110 from the sensing data according to control of the processor 140.

The electronic apparatus 100 according to an embodiment may include a sensor, camera, or the like, for determining a location of the electronic apparatus 100. For example, the electronic apparatus 100 may include an infrared light sensor, an ultrasonic sensor, a radio frequency (RF) sensor, a geomagnetic sensor, a position sensitive device (PSD) sensor, a sensor configured to detect a cliff in a driving zone, a light detection and ranging (LIDAR) sensor, or the like, and may be configured to determine a position (e.g., a location corresponding to a service item) of the electronic apparatus 100 in a specific space based on the sensing data of the sensor.

The processor 140 controls an overall operation of the electronic apparatus 100.

The processor 140 according to an embodiment may be implemented as, for example, and without limitation, a digital signal processor (DSP) for image-processing of a digital image signal, a microprocessor, a graphics processor (GPU), an AI processor, a neural processor (NPU), a time controller (T-CON), or the like, but the processor 140 is not limited thereto. The processor 140 may include, for example, and without limitation, one or more among a CPU, a micro controller unit (MCU), a microprocessing unit (MPU), a controller, an AP, a communication processor (CP), an advanced reduced instruction set computing (RISC) machine (ARM) processor, a dedicated processor, or the like. The processor 140 may be implemented as a system on chip (SoC) type or a large scale integration (LSI) type having a processing algorithm built therein, an application specific integrated circuit (ASIC) type, or in a field programmable gate array (FPGA) type.

According to an embodiment, the processor 140 may identify a service item placed in each of the plurality of trays 110 based on sensing data received from the sensors 120. As another example, the processor 140 may input sensing data to the AI model to identify a service item placed in each of the plurality of trays 110.

The processor 140 according to an embodiment may identify a travel path for delivering a corresponding service item to a corresponding location in a specific space based on the identified service item and the map information stored in the memory 130. The detailed description thereof will be described with reference to FIG. 3.

Figure 3:
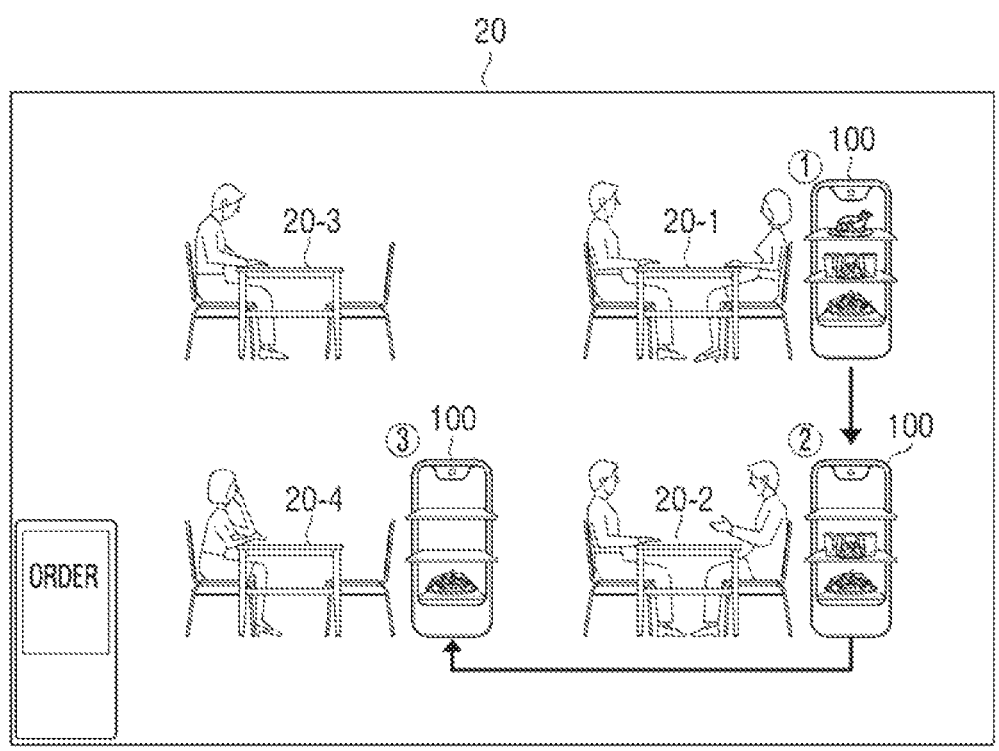
FIG. 3 is a diagram illustrating a travel path according to an embodiment.

FIG. 3 is a diagram illustrating a travel path according to an embodiment.

Referring to FIG. 3, the processor 140 according to an embodiment may identify a service item placed in each of the plurality of trays 110 based on the sensing data received from the sensor 120.

The processor 140 may identify a shortest travel path to sequentially deliver each of the plurality of service items to a plurality of corresponding locations in a specific space 20.

According to an embodiment, the processor 140 may receive service request information corresponding to each of a plurality of locations inside the specific space 20 from another electronic apparatus 200.

When the specific space 20 is a restaurant, the other electronic apparatus 200 may be implemented as an order reception robot, an order reception kiosk, or the like. The other electronic apparatus 200 may transmit service request information to the electronic apparatus 100. The service request information may include information identifying the food or beverage selected from the menu, that is, information identifying the service item, a table of the user who requested the corresponding service item, seat information, and the like. For example, the other electronic apparatus 200 may receive an order from a user, map the service item according to the order of the corresponding user and location information (e.g., table information or seat information) corresponding to the corresponding user, generate service request information, and transmit the generated service request information to the electronic apparatus 100.

Subsequently, the processor 140 may identify a shortest travel path for delivering a service item placed in the tray 110 to a corresponding location based on the service item mounted on the tray 110, the map information, and the service request information received from the other electronic apparatus 200.

According to an embodiment, the processor 140 may identify that the service item identified as being placed in the first tray 110-1 corresponds to the first location 20-1 in the specific space 20 based on the service request information. The processor 140 may identify that the service item identified as being placed in the second tray 110-2 corresponds to the second location 20-2 in the specific space 20 based on the service request information. The processor 140 may identify that the service item identified as being placed in the third tray 110-2 corresponds to a fourth location 20-4 in the specific space 20 based on the service request information.

The processor 140 may identify the shortest travel path for delivering the plurality of service items based on the map information. For example, the processor 140 may identify the shortest travel path in the specific space 20 for delivering the plurality of service items based on analyzing the map information. Additionally, or alternatively, the processor 140 may identify the shortest travel path based on travelling throughout the specific space. As an example, the processor 140 may control the electronic apparatus to sequentially travel to the first location 20-1, the second location 20-2, and the fourth location 20-4 based on the map information stored in the memory 130, and may identify the shortest travel path for delivering the plurality of service items. The "shortest travel path" may refer to a path having the shortest travel distance of the electronic apparatus 100. Additionally, or alternatively, the "shortest travel path" may refer to a path for the electronic apparatus 100 to transmit each of the plurality of service items placed on the respective trays 110 within the least amount of time. The processor 140 may identify an optimal travel path in addition to the shortest travel path. The "optimal travel path" may refer to a path that initiates the delivery of the service items to a location closest to a standby position of the electronic apparatus 100 from among a plurality of locations (e.g. a plurality of tables) in the restaurant, and continues delivery of the service items to gradually farther locations. For example, if the first location 20-1 is closest to the standby position, the second location 20-2 is the second closest to the standby position, the third location 20-3 is the third closest to the standby position, and the fourth location 20-4 is the fourth closest location to the standby position, then the optimal path may be the path in which the delivery order is the first location 20-1, the second location 20-2, the third location 20-3, and the fourth location 20-4.

As another example, the "optimal travel path" may refer to a path that initiates the delivery of the service items from the location farthest from the standby position of the electronic apparatus 100 from among the plurality of locations in the restaurant, and continues delivery of the service items to gradually closer locations. For example, if the first location 20-1 is closest to the standby position, the second location 20-2 is the second closest to the standby position, the third location 20-3 is the third closest to the standby position, and the fourth location 20-4 is the fourth closest location to the standby position, then the optimal path may be the path in which the delivery order is the fourth location 20-4, the third location 20-3, the second location 20-2, and the first location 20-1.

The "standby position" may refer to a specific position set to be placed in a state where there is no movement of the service item in the tray 110 of the electronic apparatus 100, a specific location set to be placed in the turn-off state of the electronic apparatus 100, a position set to place the electronic apparatus 100 in a stop state while the electronic apparatus 100 is placed on the tray 110, or the like.

According to an embodiment, the electronic apparatus 100 may identify a service item placed on each of a plurality of trays 110 based on a driving command of a user, and may identify a shortest travel path for sequentially transmitting each of a plurality of service items to a corresponding plurality of locations in a specific space 20. As another example, if it is identified that a service item is placed on all of the plurality of trays 110, then the electronic apparatus 100 may identify the service item placed in each of the plurality of trays 110, and identify the shortest travel path for sequentially conveying each of the plurality of service items to a corresponding plurality of locations in the specific space 20.

According to an embodiment, if a user's travel command is received and only one service item is identified in the tray 110, the electronic apparatus 100 may omit an identification step for the shortest travel path and may start travel to deliver the service item to a location corresponding to the single service item in the specific space 20.

Figure 4:
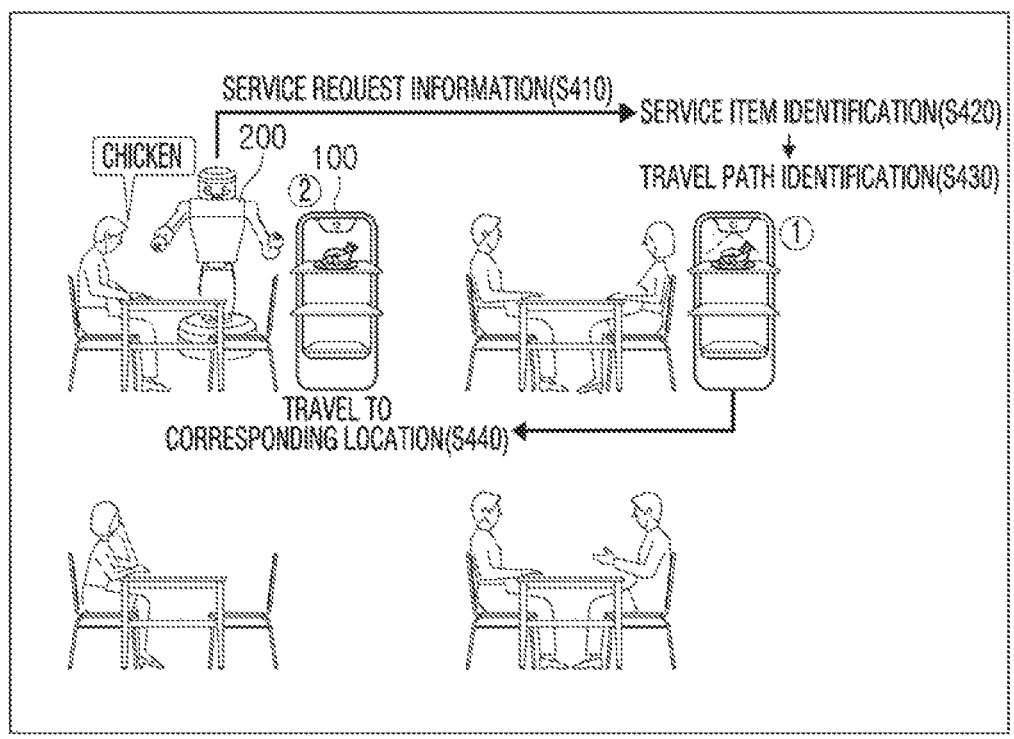
FIG. 4 is a diagram illustrating service request information according to an embodiment.

FIG. 4 is a diagram illustrating service request information according to an embodiment.

Referring to FIG. 4, a plurality of electronic apparatuses 100 and/or 200 may be provided within the specific space 20. For example, the electronic apparatus 100 may be implemented as a serving robot for serving a service item at a corresponding location, and another electronic apparatus 200 may be implemented as a robot that receives an order from a user. Although FIG. 4 illustrates the electronic apparatus 100 and the other electronic apparatus 200 in different forms for convenience, it should be understood that this is for convenience of description and that the electronic apparatus 100 and the other electronic apparatus 200 may be implemented in other forms, such as shared forms. It should also be understood that the electronic apparatus 100 may perform the serving of the service item, receiving the order of the user, and the like. That is, all operations and functions performed by the other electronic apparatus 200 may be performed by the electronic apparatus 100.

Referring to FIG. 4, the other electronic apparatus 200 according to an embodiment may receive an order from a user. In addition, the other electronic apparatus 200 may identify location information and identification information corresponding to the user in the specific space 20 based on the map information. The other electronic apparatus 200 may then identify the service item based on the user's order information, that is, information identifying the food or beverage selected by the user from the menu, and map location information corresponding to the identified service item and the user to generate service request information. The other electronic apparatus 200 may then transmit the service request information to the electronic apparatus 100 in operation S410.

According to an embodiment, the processor 140 may identify a service item placed on the tray 110 based on sensing data in operation S420.

The processor 140 may then identify a location corresponding to the identified service item based on the service request information. The "location corresponding to the identified service item" may refer to the location of the user, the location of the table, and the like, of a user who orders the corresponding service item. The processor 140 may then identify a travel path for delivery of the corresponding service item based on the identified location in operation S430. According to an embodiment, when a plurality of service items placed on the trays 110 or a plurality of locations corresponding to the placed service items are identified, the processor 140 may identify a shortest travel path for sequentially transmitting each of the plurality of service items to a plurality of corresponding locations in the specific space 20.

The processor 140 may control travel of the electronic apparatus 100 based on the identified travel path.

Returning to FIG. 2, the service request information according to an embodiment may include service request time information for a service item. According to an embodiment, the processor 140 may identify a travel path based on the service request time information. The detailed description thereof will be described with reference to FIG. 5.

Figure 5:
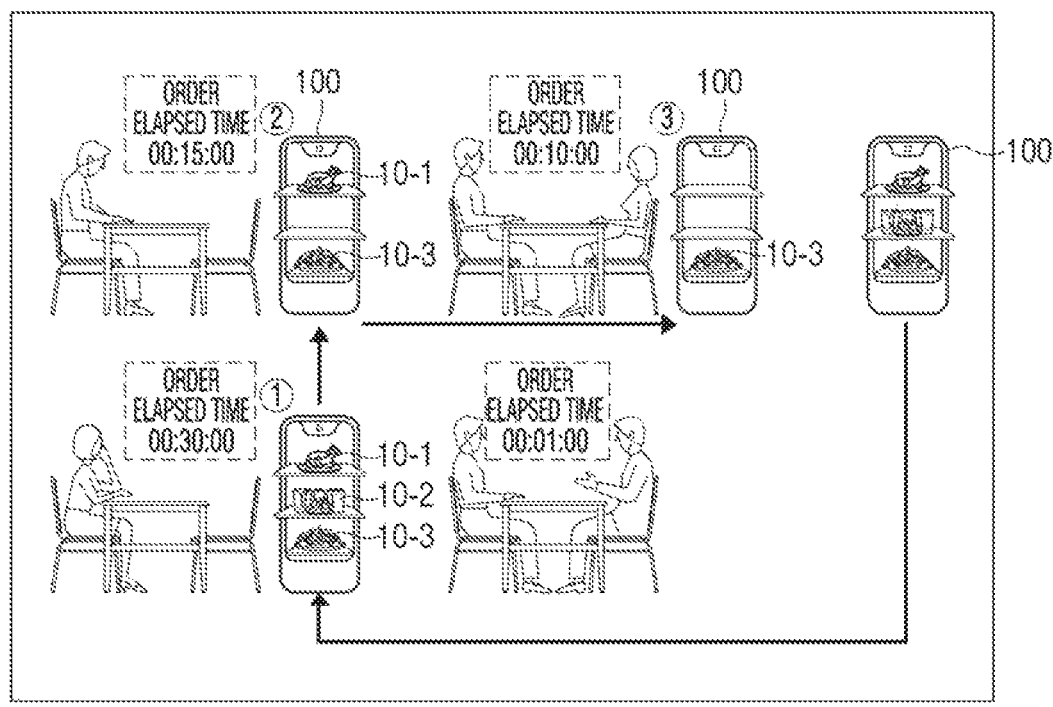
FIG. 5 is a diagram illustrating service request time information according to an embodiment.

FIG. 5 is a diagram illustrating service request time information according to an embodiment.

Referring to FIG. 5, the service request information according to an embodiment may include the service request time information for the service item.

For example, the other electronic apparatus 200 may receive an order from a user, map a location and order reception time corresponding to a corresponding user in the specific space 20, and generate service request information in accordance with the received order. The "order reception time" may be referred to as the order elapsed time, the service request time information, etc., and will hereinafter be referred to as "service request time information" for convenience.

The processor 140 according to an embodiment may identify the travel path based on service request time information corresponding to each of the plurality of locations and information of a location on a map.

For example, the processor 140 may identify service request time information corresponding to a service item placed in each of the plurality of trays 110. Referring to FIG. 5, the processor 140 may identify service request time information of each of the first service item 10-1 placed on the first tray 110-1, the second service item 10-2 mounted on the second tray 110-2, and the third service item 10-3 mounted on the third tray 110-3. For example, based on the service request time information, if the order elapsed time corresponding to the first service item 10-1 is 15 minutes, the order elapsed time corresponding to the second service item 10-2 is 30 minutes, and the order elapsed time corresponding to the third service item 10-3 is 10 minutes, the processor 140 may identify the travel path so that the plurality of service items are delivered in order of the oldest order to the most recent order, i.e., the order of the second service item 10-2, the first service item 10-1, and the third service item 10-3.

As another example, the processor 140 may identify the travel path so that the service item corresponding to the service request with an elapsed threshold time is delivered first, based on the service request time information.

For example, if the order elapsed time corresponding to the first service item 10-1 is 15 minutes based on the service request time information, the order elapsed time corresponding to the second service item 10-2 is 30 minutes, and the order elapsed time corresponding to the third service item 10-3 is 10 minutes, the travel path may be identified so that the second service item 10-2 having a threshold time greater than 20 minutes is preferentially transmitted over the remaining service items. The processor 140 may then identify the shortest travel path for sequentially conveying the first service item 10-1 and the third service item 10-3. If delivering the first service item 10-1 after delivering the third service item 10-3 based on the distance traveled by the electronic apparatus 100 is shorter than delivering the third service item 10-3 after delivering the first service item 10-1, the processor 140 may preferentially deliver the second service item 10-2, and identify the travel path so that the service item is delivered in the order of the third service item 10-3 and the first service item 10-1.

That is, the processor 140 may identify the travel path such that the service item corresponding to the service request exceeding the threshold time is preferentially delivered, and service items corresponding to service requests having service request times that do not exceed the threshold time are delivered in accordance with the shortest travel path.

Returning to FIG. 5, the processor 140 according to one embodiment may identify the time required to prepare a service item corresponding to additional service request information when additional service request information is received at a first location that is different from a plurality of locations within a specific space from the other electronic apparatus 200. The processor 140 may then determine whether to travel according to the identification result. The detailed description thereof will be described with reference to FIG. 6.

Figure 6:
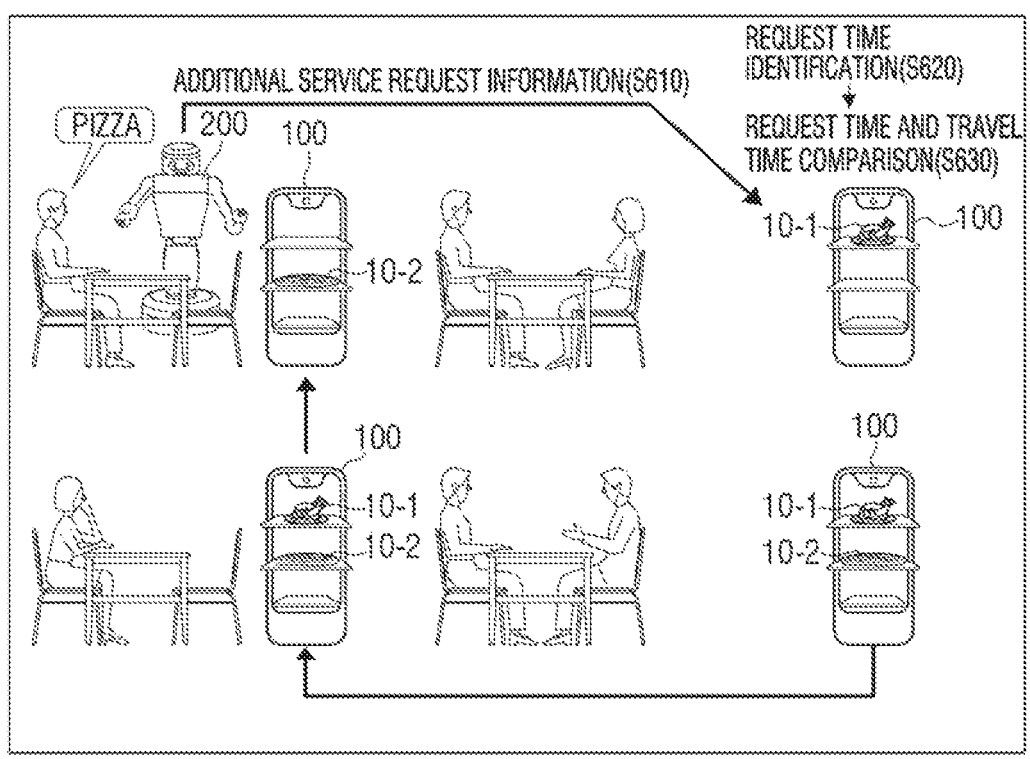
FIG. 6 is a diagram illustrating additional service request according to an embodiment.

FIG. 6 is a diagram illustrating additional service request according to an embodiment.

Referring to FIG. 6, while at least one of the plurality of trays 110 provided in the electronic apparatus 100 is provided with the service item 10-1, additional service request information may be received at a first location.

For example, the other electronic apparatus 200 may receive an order of food or beverage from a user (e.g., a new visiting customer) and generate additional service request information in accordance with the user order. The other electronic apparatus 200 may then transmit additional service request information to the electronic apparatus 100 in operation S610.

The additional service request information indicates a case in which new service request information is received while the first service item 10-1 corresponding to the service request information transmitted by the electronic apparatus 100 is placed in the tray 110, and represents service request information different from the previously transmitted service request information.

Referring to FIG. 6, in a state where the first service item 10-1 is placed on the first tray 110-1 of the electronic apparatus 100 according to an embodiment, the electronic apparatus 100 may receive additional service request information corresponding to the first location from the other electronic apparatus 200.

The processor 140 may then identify the time required to prepare the service item corresponding to the additional service request information in operation S620. For example, the processor 140 may identify the time required to prepare the user's order of "pizza" corresponding to the first location in accordance with the additional service request information.

The processor 140 may then compare the identified request time and the required time required for delivery of the first service item 10-1 placed in the current tray 110. For example, the processor 140 may compare the time required for provision of the service item according to the additional service request information and the time required for travel through the shortest travel path for delivery of the first service item 10-1 placed in the current tray 110 in operation S630.

When the time required for the provision of the service item is less than the time required for the delivery of the first service item 10-1, the processor 140 may wait for the travel of the electronic apparatus 100 until the corresponding service item is placed in any one of the plurality of trays 110.

For example, the processor 140 may wait for travel until the service item according to the additional service request information is ready if the time required for provision of the service item according to the additional service request information is less than the time required for delivery of the first service item 10-1 placed on the tray 110 of the current the electronic apparatus 100. The processor 140 may then start travel if the service item according to the additional service request information is placed on the tray 110. Referring to FIG. 6, the processor 140 may wait for the electronic apparatus 100 to travel until the first service item 10-1 corresponding to the previously received service request information is placed in the first tray 110-1 and the second service item 10-2 corresponding to the additional service request information is placed in the second tray 110-2.

The processor 140 may then identify the shortest travel path for delivering each of the first service item 10-1 and the second service item 10-2 to a corresponding location when the second service item 10-2 is placed in the second tray 110-2. According to an embodiment, the processor 140 may deliver the first service item 10-1 and the second service item 10-2 in order based on the identified shortest travel path, and may deliver in the order of the second service item 10-2 and the first service item 10-1.

Returning to FIG. 1, any one of the plurality of trays 110 according to an embodiment may have a comparatively higher priority than remaining trays.

For example, the first tray 110-1 among the first tray 110-1, the second tray 110-2, and the third tray 110-3 provided in the electronic apparatus 100 may have a comparatively higher priority than the second tray 110-2 and the third tray 110-3. The priority may mean that the service item placed on the tray is preferentially transferred to the service item mounted on the other tray.

According to an embodiment, the electronic apparatus 100 may identify a driving path so that a service item placed on a tray having a high priority is preferentially transferred to a location corresponding to a corresponding service item among a plurality of locations in the specific space 20. The processor 140 may identify the travel path such that the service item placed in the tray having high priority is preferentially delivered, and the service items placed in the remaining trays are delivered via the shortest travel path. As another example, the processor 140 may identify the travel path so as to preferentially deliver the service item placed in the tray having a high priority, and then deliver a service item exceeding the threshold time among the service items placed in the rest of the trays.

Figure 7:
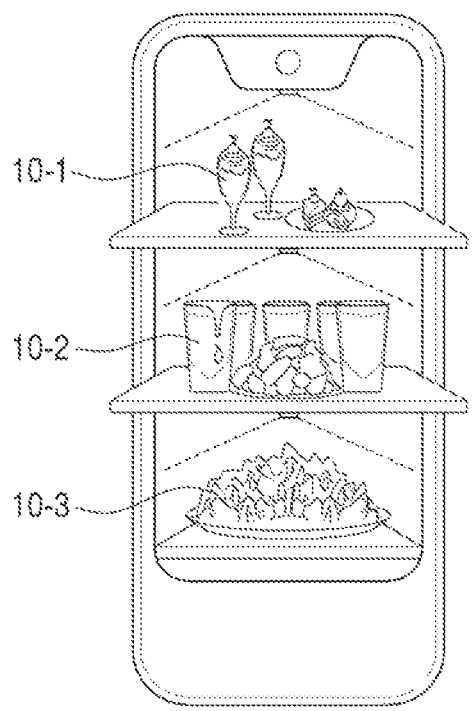
FIG. 7 is a diagram illustrating a service item according to an embodiment.

FIG. 7 is a diagram illustrating a service item according to an embodiment.

Referring to FIG. 7, the processor 140 according to an embodiment may identify whether a service item placed on the tray 110 corresponds to a preset service.

In an example, the memory 130 may store information regarding a service item that should be preferentially transferred. For example, the memory 130 may store information about a service item having a risk of being transformed, a service item prone to melting or going cold, or the like. As another example, the electronic apparatus 100 may receive information, lists, or the like, for a service item that should be preferentially served (or delivered) from an external device (e.g., a server).

If the identified service item is identified as corresponding to a preset item, the processor 140 may identify the travel path such that the corresponding service item is preferentially delivered to the corresponding location.

Referring to FIG. 7, if the first service item 10-1 placed on the first tray 110-1 is identified as ice cream, the processor 140 may identify whether the identified ice cream should be preferentially delivered based on the information stored in the memory 130.

The processor 140 may preferentially deliver the first service item 10-1 placed on the first tray 110-1 to a corresponding location, and may identify a travel path such that the second service item 10-2 and the third service item 10-3 are delivered to the second tray 110-2 and the third tray 110-3, respectively. The processor 140 may identify a travel path for delivering the second service item 10-2 and the third service item 10-3 as the shortest travel path.

Figure 8:
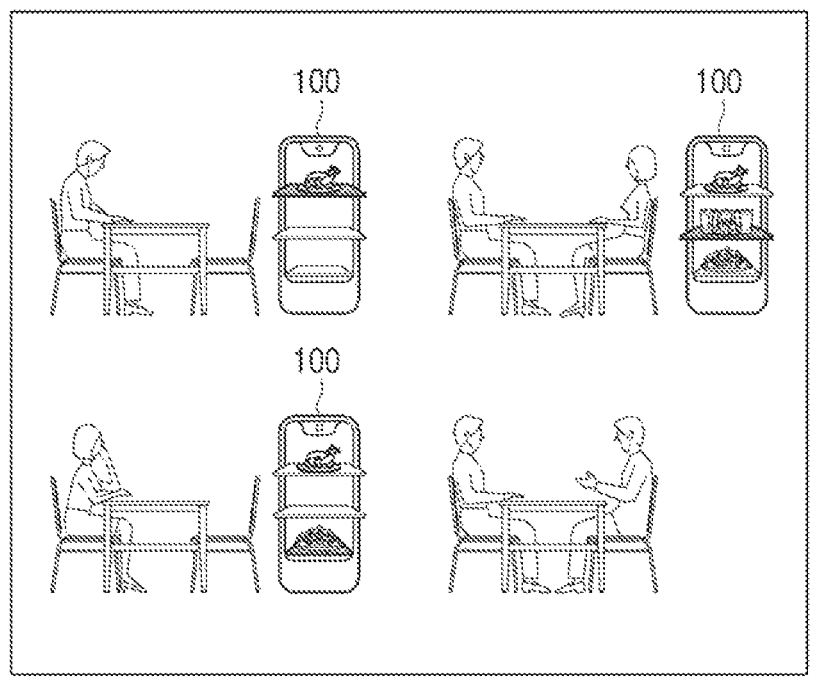
FIG. 8 is a diagram illustrating an electronic apparatus according to an embodiment.

FIG. 8 is a diagram illustrating an electronic apparatus according to an embodiment.

Each of the plurality of trays 110 provided in the electronic apparatus 100 according to an embodiment may include a plurality of light emitting elements.

Referring to FIG. 8, when the processor 140 according to an embodiment reaches any one of a plurality of locations in the specific space 20, the processor 140 may cause the light emitting element to emit light or cause a speaker to output sound in order to permit a user to recognize the tray on which the service item corresponding to the reached location is placed.

For example, when the electronic apparatus 100 reaches a first location among a plurality of locations in the specific space 20, the processor 140 may cause a plurality of light emitting elements provided on a tray on which the service item, that is a menu item ordered by the user corresponding to the first location, is placed to emit light.

As another example, the processor 140 may further include a display, a speaker, or the like. When the electronic apparatus 100 reaches the first location among the plurality of locations in the specific space 20, the processor 140 may output information identifying a tray where the service item, that is, a menu item ordered by the user corresponding to the first location, is placed (e.g., "please bring me the food on the first tray.") as a video signal through a display or as a sound signal through a speaker.

Returning to FIG. 2, the electronic apparatus 100 according to an embodiment may further include a camera, a communication interface, and a display.

The camera according to an embodiment may provide the processor 140 with an obtained image.

The camera according to an embodiment may obtain an image including the face of the user under the control of the processor 140. For example, if the processor 140 is identified as being adjacent to the electronic apparatus 100, the processor 140 may control the camera to obtain an image that includes the user's face. According to an embodiment, the camera 110 may be implemented as a plurality of cameras, such as a front camera and a rear camera.

The processor 140 according to an embodiment may map location information of a user in a specific space and a service item corresponding to the order of the corresponding user to generate service request information.

As another example, the processor 140 may map a service item corresponding to the order of the user and the feature information of the user to generate the service request information. For example, the processor 140 may obtain face recognition information (e.g., face ID), body type information, gender information, etc., based on the image obtained through the camera, and map the obtained information and the service item ordered by the corresponding user to generate service request information. The processor 140 may compare the image obtained through the camera with the face recognition information included in the service request information, and deliver the service item placed in the tray 110 to the corresponding user.

The communication interface may be configured to receive various types of content. For example, the communication interface may receive an image signal by streaming or downloading from an external device (e.g., a source device), an external storage medium (e.g., a universal serial bus (USB) device), an external server (e.g., a web server, etc.) through communication methods such as, for example, and without limitation, an access point (AP)-based wireless fidelity (Wi-Fi) (wireless local area network (WLAN)), Bluetooth, Zigbee, WLAN, wide area network (WAN), Ethernet, IEEE 1394, high definition multimedia interface (HDMI), universal serial bus (USB), mobile high-definition link (MHL), advanced encryption standard (AES)/European broadcasting union (EBU), optical, coaxial, or the like. The image signal may be a digital image signal of any one of standard definition (SD), high definition (HD), full HD, ultra HD, but the image signal is not limited thereto.

The electronic apparatus 100 according to an embodiment may perform communication with other electronic apparatuses in a peer-to-peer (P2P) form through a communication interface to share information. In an example, the electronic apparatus 100 may be configured to communicate with other electronic apparatuses in an ad hoc mode for transmitting or receiving information in the form of P2P between devices without an AP.

According to an embodiment, the electronic apparatus 100 may receive service request information from the other electronic apparatus 200 via a communication interface. As another example, the electronic apparatus 100 may transmit, to the other electronic apparatus 200, a serving (or delivery) completion of the service item to the other electronic apparatus 200, a preference for the service item of the user identified based on the image obtained through the camera, an order history, or the like, via a communication interface.

The electronic apparatus 100 according to an embodiment may include a display and the processor 140 may control the display 150 to provide information regarding a tray 110 on which the service item corresponding to the current location of the electronic apparatus 100 is placed. For example, the display may be implemented as a display of various types such as, for example, and without limitation, a liquid crystal display (LCD), an organic light emitting diodes (OLED) display, a plasma display panel (PDP), or the like. The embodiment is not limited thereto and the processor 140 may provide information regarding a tray on which the service item corresponding to the current location of the electronic apparatus 100 is placed as an audio signal using an output component such as a speaker. In the display, a backlight unit, a driving circuit which may be implemented as an a-si thin-film transistor (TFT), a low temperature poly silicon (LTPS) TFT, an organic TFT (OTFT), or the like, may be included. The display may be implemented as a touch screen coupled to a touch sensor, a flexible display, a third-dimensional (3D) display, or the like.

In addition, according to an embodiment, the display may include a display panel for outputting an image, as well as a bezel housing the display panel. According to an embodiment, a bezel may include a touch sensor for sensing user interaction.

Figure 9:
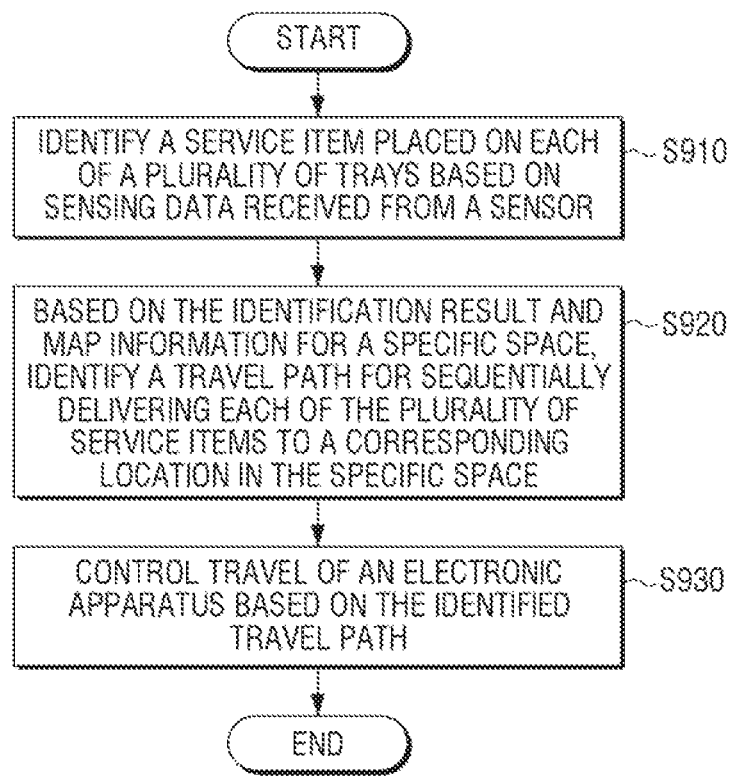
FIG. 9 is a flowchart illustrating a control method of an electronic apparatus according to an embodiment.

FIG. 9 is a flowchart illustrating a control method of an electronic apparatus according to an embodiment.

The control method of the electronic apparatus according to an embodiment may include identifying a service item placed on each of a plurality of trays based on sensing data received from a sensor in operation S910.

Based on the identification result and map information for a specific space, a travel path for sequentially delivering each of the plurality of service items to a corresponding plurality of locations in a specific space is identified in operation S920. The identified travel path may be a "shortest travel path," an "optimal travel path," or another type of travel path.

Traveling of an electronic apparatus based on the identified travel path is controlled in operation S930.

According to an embodiment, the control method may further include the steps of receiving service request information corresponding to each of a plurality of locations in the specific space from another electronic apparatus; and identifying a service item corresponding to each of the plurality of locations based on the identification result and the received service request information.

The service request information may include location information on a map corresponding to each of the plurality of locations and information identifying a service item corresponding to each of the plurality of locations.

The service request information may further include the service request time information for a service item.

According to an embodiment, the step of identifying a travel path may include identifying a travel path based on service request time information corresponding to each of a plurality of locations and location information on a map; and the controlling the travel in operation S930 may include controlling the travel of the electronic apparatus based on the identified travel path.

The step of identifying the travel path may include the step of identifying the travel path such that a service item corresponding to a service request exceeding the threshold time is preferentially delivered based on the service request time information corresponding to each of the plurality of locations.

According to an embodiment, the control method may further include the steps of, based on additional service request information being received, from another electronic apparatus, at a first location that is different from a location of the electronic apparatus, identifying a time required to prepare a service item corresponding to the additional service request information; comparing the identified preparation time and the time required for travel of the identified travel path; and based on the identified request time being less than the travel time, waiting until the service item corresponding to the additional service request information is placed in one of the plurality of trays.

Step S920 of identifying the travel path may include, based on the service item corresponding to the additional service request information being identified as being placed on one of a plurality of trays, identifying a travel path to sequentially deliver a service item corresponding to the plurality of locations and the first location, and step of S930 of controlling travel may include controlling driving of the electronic apparatus based on the identified travel path.

In addition, if a tray of any one of the plurality of trays has a higher priority than the remaining trays, then the step of identifying the travel path in operation of S920 may include the step of identifying the travel path such that the service item placed on the tray having the high priority is preferentially delivered to a corresponding location among a plurality of locations in a specific space, and the step of controlling the travel in operation S930 may include controlling the travel of the electronic apparatus based on the identified travel path.

According to an embodiment, each of a plurality of trays may be provided on a main body of the electronic apparatus at a different height, and a sensor corresponding to each of the plurality of trays may be disposed at a lower portion of a tray provided above each tray.

According to an embodiment, the step of identifying the travel path in operation S920 may include the steps of identifying a travel path such that the identified service item is preferentially delivered to a corresponding location in a specific space if any one of the plurality of service items is identified as corresponding to a preset item; and controlling the travel comprises controlling the travel of the electronic apparatus based on the identified travel path.

According to an embodiment, the electronic apparatus includes a plurality of light emitting devices provided in each of a plurality of trays, and a control method according to an embodiment may include a step of causing the plurality of light emitting devices corresponding to a tray on which a service item corresponding to a location is placed to emit light when the electronic apparatus reaches one of a plurality of locations in a specific space.

The various example embodiments described above may be implemented by a non-transitory computer-readable medium configured to store instructions, and a processor configured to execute the instructions, and may be implemented by software, hardware, or the combination of software and hardware. In some cases, embodiments described herein may be implemented by the processor. According to a software implementation, embodiments such as the procedures and functions described herein may be implemented by separate software modules. Each of the software modules may perform one or more of the functions and operations described herein.

The computer instructions for performing the processing operations of the electronic apparatus 100 according to the various embodiments described above may be stored in a non-transitory computer-readable medium. The computer instructions stored in the non-transitory computer-readable medium cause the above-described specific device to perform the processing operations of the electronic apparatus 100 according to the above-described various embodiments when executed by the processor of the specific device.

The non-transitory computer-readable medium may refer, for example, to a medium that stores data, such as a register, a cache, a memory or etc., and is readable by an apparatus. For example, the aforementioned various applications, instructions, or programs may be stored in the non-transitory computer-readable medium such as, for example, a compact disc (CD), a digital versatile disc (DVD), a hard disc, a Blu-ray disc, a USB drive, a memory card, a read only memory (ROM), and the like.

While various embodiments have been shown and described, the disclosure is not limited to the specific embodiments. It should be understood by those of ordinary skill in the art that various changes in form and details may be made therein without departing from the spirit and scope as defined by the following claims and their equivalents.

What is claimed is:

1. An electronic apparatus comprising:
a plurality of trays on which a plurality of service items are provided;
a plurality of sensors, each sensor of the plurality of sensors being respectively disposed above a corresponding tray of the plurality of trays;
a memory configured to store map information of a specific space; and
a processor configured to:
identify a respective unidentified service item provided on each of the plurality of trays, based on sensing data received from a respective sensor of the plurality of sensors corresponding to each tray,
obtain respective service request information corresponding to each of a plurality of locations in the specific space,
based on the service request information, the map information stored in the memory, and a result of the identifying of the respective unidentified service item, identify a travel path for the electronic apparatus to sequentially deliver each of a plurality of service items that are identified to the plurality of locations, and
control travel of the electronic apparatus, based on the travel path, wherein the service request information for each location comprises location information corresponding to the location, and item information indicating at least one service item requested by a user located at the location,
wherein the processor is configured to identify the travel path by:
based on the result of the identifying of the respective unidentified service item, and service request information indicating a corresponding service item in the item information thereof, identifying at least one location to include in the travel path from among the plurality of locations, and
based on the location information corresponding to the identified at least one location included in the service request information, and the map information, identifying the travel path,
wherein a high priority tray, of the plurality of trays, is pre-designated prior to service items being placed thereon to indicate a higher priority than other trays of the plurality of trays, and
wherein the processor is further configured to identify the travel based on placement of a service item on the high priority tray, such that the service item placed on the high priority tray is delivered to a corresponding location among the plurality of locations in the specific space before other service items are delivered to corresponding locations.

2. The electronic apparatus of claim 1, wherein the processor is further configured to:
receive the respective service request information from another electronic apparatus.

3. The electronic apparatus of claim 1, wherein the service request information further comprises respective service request time information for each of the respective service items, and
wherein the processor is further configured to identify the travel path based on the service request time information and the location information.

4. The electronic apparatus of claim 3, wherein the processor is further configured to identify the travel path based on an elapsed time determined from the service request time information such that a service item having an elapsed time exceeding a threshold time is delivered before other service items.

5. The electronic apparatus of claim 1, wherein the processor is further configured to:
based on receiving, from another electronic apparatus, service request information corresponding to an additional location that is different from the plurality of locations in the specific space, identify a preparation time to prepare a service item corresponding to the service request information,
compare the preparation time and a travel time for completing travel on the travel path, and
based on the preparation time being less than the travel time, control travel of the electronic apparatus to thereby delay travel along the travel path until after the service item is placed on one of the plurality of trays.

6. The electronic apparatus of claim 5, wherein the processor is further configured to, based on identifying that the service item corresponding to the service request information is placed on one of the plurality of trays, identify an updated travel path to sequentially deliver the respective service items corresponding to the plurality of locations and the additional location, and control travel of the electronic apparatus, based on the updated travel path.

7. The electronic apparatus of claim 1, wherein the plurality of trays includes a first tray that is disposed above a second tray,
the plurality of sensors includes a first sensor disposed above the first tray and configured to sense a first service item provided on the first tray, and a second sensor disposed above the second tray and configured to sense a second service item provided on the second tray, and
the second sensor is disposed underneath the first tray.

8. The electronic apparatus of claim 1, wherein the processor is further configured to:
based on identifying that a service item, among the plurality of service items, corresponds to a predetermined item, identify the travel path such that the service item corresponding to the predetermined item is preferentially delivered to a corresponding location in the specific space.

9. The electronic apparatus of claim 1, further comprising:
a plurality of light emitting devices provided on each of the plurality of trays,
wherein the processor is further configured to, based on the electronic apparatus arriving at a location, of the plurality of locations, in the specific space, cause the plurality of light emitting devices corresponding to a tray on which a service item corresponding to the location is placed to emit light.

10. A method for controlling an electronic apparatus including a plurality of trays on which a plurality of service items are provided and a plurality of sensors, each sensor of the plurality of sensors being respectively disposed above a corresponding tray of the plurality of trays, the method comprising:
identifying a respective unidentified service item provided on each of the plurality of trays, based on sensing data received from a respective sensor of the plurality of sensors corresponding to each tray;

obtaining respective service request information corresponding to each of a plurality of locations in a specific space;

based on the service request information, map information of the specific space, and a result of the identifying of the respective unidentified service item, identifying a travel path for the electronic apparatus to sequentially deliver each of a plurality of service items that are identified to the plurality of locations; and controlling travel of the electronic apparatus, based on the travel path, wherein the service request information for each location comprises location information corresponding to the location, and item information indicating at least one service item requested by a user located at the location, wherein the identifying of the travel path comprises:
based on the result of the identifying of the respective unidentified service item, and service request information indicating a corresponding service item in the item information thereof, identifying at least one location to include in the travel path from among the plurality of locations, and based on the location information corresponding to the identified at least one location included in the service request information, and the map information, identifying the travel path, wherein a high priority tray, of the plurality of trays, is pre-designated prior to service items being placed thereon to indicate a higher priority than other trays of the plurality of trays, and wherein the travel path is identified based on placement of a service item on the high priority tray, such that the service item placed on the high priority tray is delivered to a corresponding location among the plurality of locations in the specific space before other service items are delivered to corresponding locations.

11. The method of claim 10, wherein the obtaining of the respective service request information comprises receiving the respective service request information corresponding to each of the plurality of locations in the specific space from another electronic apparatus.

12. The method of claim 10,
wherein the service request information further comprises respective service request time information for each of the respective service items, and wherein the identifying of the travel path comprises identifying the travel path based on the service request time information and the location information.

13. The method of claim 12, wherein the identifying of the travel path comprises identifying the travel path based on an elapsed time determined from the service request time information such that a service item having an elapsed time exceeding a threshold time is delivered before other service items.

14. The method of claim 10, further comprising:
based on receiving, from another electronic apparatus, service request information corresponding to an additional location that is different from the plurality of locations in the specific space, identify a preparation time to prepare a service item corresponding to the service request information;

comparing the preparation time and a travel time for completing travel on the travel path; and based on the preparation time being less than the travel time, controlling travel of the electronic apparatus to thereby delay travel along the travel path until after the service item is placed on one of the plurality of trays.

15. The method of claim 14, wherein the identifying of the travel path comprises:
based on identifying that the service item corresponding to the service request information is placed on one of the plurality of trays, identifying an updated travel path to sequentially deliver the respective service items corresponding to the plurality of locations and the additional location.

16. The method of claim 10, wherein the plurality of trays includes a first tray that is disposed above a second tray,
the plurality of sensors includes a first sensor disposed above the first tray and configured to sense a first service item provided on the first tray, and a second sensor disposed above the second tray and configured to sense a second service item provided on the second tray, and the second sensor is disposed underneath the first tray.

17. The method of claim 10, wherein the identifying of the travel path comprises:
based on identifying that a service item, of the plurality of service items, corresponds to a predetermined item, identifying the travel path such that the service item corresponding to the predetermined item is preferentially delivered to a corresponding location in the specific space.

18. The method of claim 10, wherein a plurality of light emitting devices are provided on each of the plurality of trays, and
the method further comprises, based on the electronic apparatus arriving at a location, of the plurality of locations, in the specific space, causing the plurality of light emitting devices corresponding to a tray on which a service item corresponding to the location is placed to emit light.

* * * * *